July 5, 1955 L. BORG 2,712,635
DEVICE FOR MEASURING DIRECT CURRENT
Filed May 11, 1951 2 Sheets-Sheet 1
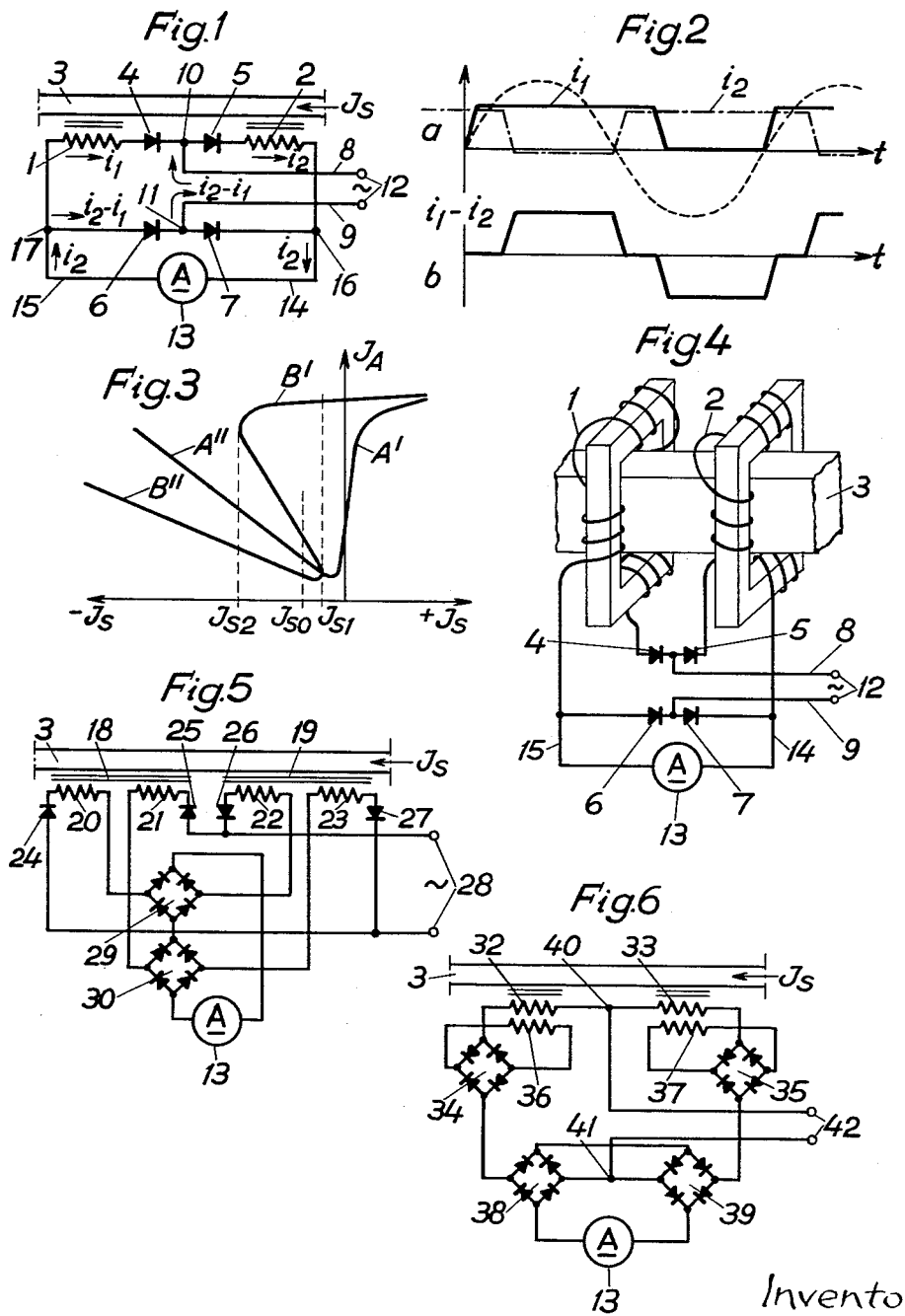
Inventor
Lennart Borg
By [signature]
Attorney.

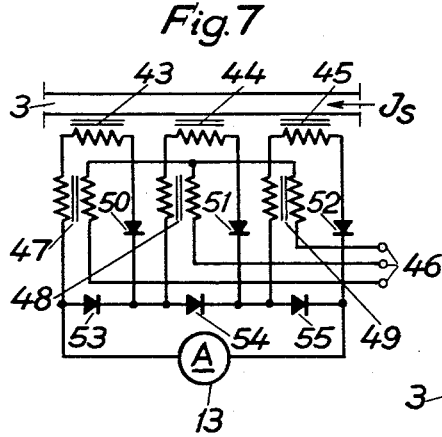
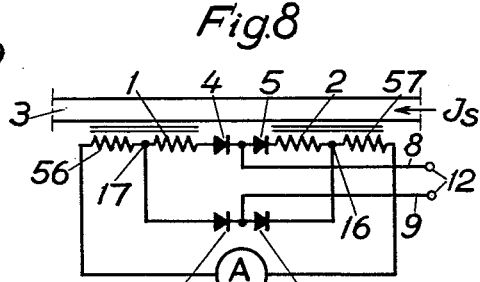
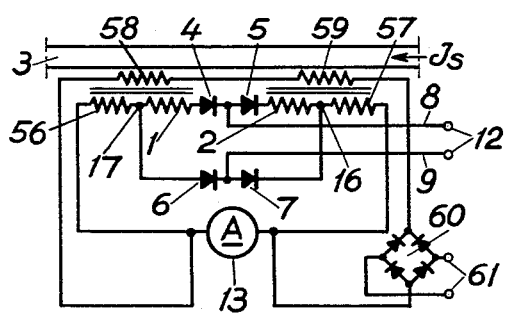
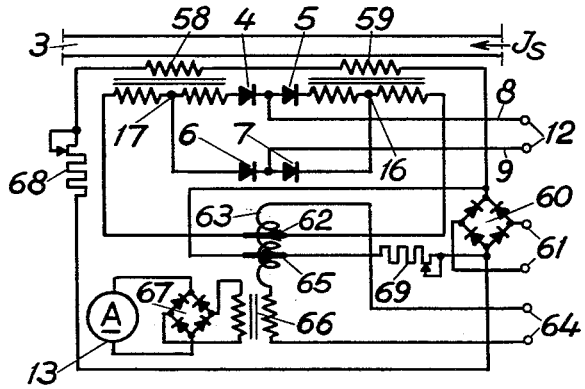

United States Patent Office 2,712,635
Patented July 5, 1955

2,712,635

DEVICE FOR MEASURING DIRECT CURRENT

Lennart Borg, Ludvika, Sweden, assignor to Allmanna Svenska Elektriska Aktiebolaget, Vasteras, Sweden, a Swedish corporation Application May 11, 1951, Serial No. 225,826

Claims priority, application Sweden November 13, 1950

7 Claims. (Cl. 324—127)

In electric power engineering it is well known to use transductors for measuring direct currents. The device hereinafter referred to as a transductor is a saturable-core reactor consisting of one or more ferro-magnetic cores with windings by means of which an alternating current voltage or current can be varied by a voltage or current using saturation phenomena on the core material. A common measuring device for that purpose principally consists of two two-legged iron cores provided with windings which are series-connected and connected to an alternating current source. The cores are usually threaded on a direct current bus-bar and so arranged that they are magnetized in opposite directions by a direct current traversing the bus-bar in relation to the alternating current magnetization at a certain moment. In such devices the current in the alternating current circuit will be directly proportional to the direct current in the bus-bar, and the device will act as a current transformer. The ampere turns from the alternating current and from the direct current will be alike.

When measuring large direct currents, however, said ampere turns will become very large. The power consumption from the alternating current line, which is almost exclusively reactive, is proportional to the product of ampere turns and core area. It is necessary, however, to make the core area so large that the flux in the core appreciably predominates over the leakage flux of the alternating current coils, if good measuring accuracy shall be obtained. In that way the consumption of reactive power will be unreasonably large when measuring currents exceeding the order of magnitude 30 kA., and the known measuring device will thus be unsuitable at these current intensities.

In order to eliminate the said drawbacks, it is old to rectify the alternating current traversing the transductor and to make this rectified current magnetize the transductor cores in a separate winding in the direction opposed to the ampere turns of the current to be measured. By means of such a device, the measuring accuracy will be appreciably increased.

A connection of the described type in reality constitutes what is usually called self-magnetization. The purpose of the latter is mostly to amplify the external direct current by aid of the rectified current, so that the amplification of the transductor will be increased. In the described connection, on the other hand, the self-magnetization is arranged to counteract the magnetization by the external direct current, and such a connection may consequently be called negative self-magnetization. In conjunction herewith it may further be pointed out that by the expression "transductor element" is usually meant a magnetic circuit with one or more windings, whereby the magnetic circuits of several transductor elements, however, partly may be common.

It has been proposed to use a transductor with so called internal self-magnetization for measuring purposes. Valve elements are then connected in series with the transductor elements, and the latter elements obtain currents giving ampere turns, the amplitude of which will be equal to the ampere turns of the current to be measured. The currents in the usually parallel connected circuits on the transductor elements will be subtracted in the common alternating current connection. As these currents overlap each other, this difference gives rise to inactive intervals. The latter vary strongly with the suppressed alternating current voltage and with the resistance of the circuit, and consequently the desired current transformer character will not be obtained.

The present invention, however, relates to a device which entirely avoids the said drawbacks and which allows measuring with great accuracy and a very small demand of reactive power. The invention concerns a device for measuring direct current by means of a self-magnetized transductor, provided with at least two transductor elements, the transductor being magnetized by the current which shall be measured in opposite direction to the ampere turns caused by the self-magnetization. The main feature is that a current measuring instrument is adapted to be traversed by a current through valve elements, which are so arranged that the said current in every moment is derived from the numerically largest of the currents in the windings of the transductor elements, connected to the alternating current line.

The invention shall further be described in connection with the accompanying drawings, in which:

Figure 1 diagrammatically shows the simplest form according to the invention,

Figure 2 principally shows oscillograms representing the currents in the transductor elements, Figure 3 shows the relationship between the instrument current and the current to be measured.

Figure 4 shows a perspective view of the arrangement of the windings according to the form illustrated in Figure 1.

Figures 5–10 show different forms according to the invention.

In Figure 1, two transductor elements are shown diagrammatically, the alternating current windings being designated by 1 and 2. The current to be measured is supposed to traverse a bus-bar 3, but may of course also traverse a winding on the transductor cores. The windings 1 and 2 are connected in series with valve elements 4 and 5, respectively, forming two branches of a rectifier connection, two way two-pulse connection (Graetz-connection). The valves 6 and 7 are connected in each of the other two branches. The leads 8 and 9 connect the alternating current terminals 10 and 11 of the rectifier with an alternating current source 12. The current measuring device 13, in its simplest form constituted by an indicating instrument, is by means of leads 14 and 15 connected to the direct current terminals 16 and 17 of the rectifier.

For explaining the mode of operation of this device, the case is considered that the winding 1 is traversed by the current $i_1$ and the winding 2 by the current $i_2$, $i_2$ for the moment being supposed to be larger than $i_1$. The directions of the currents are denoted by arrows along the windings. In the alternating current lead 8 the current $i_2-i_1$ must flow in the direction from the alternating current source. In the lead 9 the same current $i_2-i_1$ must flow in the direction to the alternating current source. This current can only pass the valve 6, and consequently the valve 7 will be blocked, the result of this being that the current $i_2$ from the winding 2 will pass the point 16 and flow through the instrument 13 to the point 17, where it will branch in a current $i_1$ traversing the winding 1 and a current $i_2-i_1$ passing the valve 6 to the lead 9.

If, on the other hand, $i_1$ should be larger than $i_2$, the current in the leads 8, 9 would change direction. The current from the alternating current source would then from the lead 9 pass the valve 7, whereas the valve 6 would be blocked with the result that the current $i_1$ would traverse the instrument.

It is thus obvious that the instrument will always be traversed by the largest of the currents $i_1$ and $i_2$ through the transductor elements.

Figure 2a shows current curves for the two transductor windings 1 and 2, the current $i_1$ being shown by full lines and the current $i_2$ by a chain line, the latter, for the sake of distinctness, being drawn somewhat aside of the coinciding full lines. The alternating current voltage curve is shown by a dash-line. The amplitude value of the currents $i_1$ and $i_2$ will give the ampere turns opposing the ampere turns from the current to be measured. The length of the intervals during which the currents overlap each other is dependent on variations of the resistances of the circuits or the supplied alternating current voltage. The said variations, however, will not have any influence on the measuring result, as according to the invention always the largest of the currents $i_1$ and $i_2$ is used for measuring.

In Figure 2b the differential current $i_1-i_2$ in the alternating current leads is illustrated. It appears from this curve that it would be unsuitable to base the measuring on this difference, as variations in the overlapping obviously would cause a varying average value of this alternating current, in spite of its amplitude being constant.

Figure 3 shows the relationship between the instrument current $I_A$ and the current to be measured $I_S$. The curve A'A'' represents a connection according to Figure 1. The branch A' on the curve indicates the operation range where the self-magnetization coacts with the current to be measured, and a large sensitivity is then obtained. This is the common use of self-magnetization. The branch A'', on the other hand, shows the course when the self-magnetization is brought to oppose the current to be measured. It is that range which is used in the invention, and the method may, as mentioned above, be called negative self-magnetization.

Figure 4 shows the practical arrangement of the transductor elements, their windings and the bus-bar traversed by the current to be measured. This figure illustrates the details used in the connection according to Figure 1, and corresponding items are denoted by same numerals.

Except the connection shown in Figure 1 any transductor connection may of course be used which fulfils the requirements. In the Figures 5, 6 and 7 some forms of that kind are shown which, however, have not the same simple design as that shown in Figure 1, but use a considerably larger number of connection elements.

According to Figure 5, each of two transductor elements 18, 19 is provided with two windings 20, 21 and 22, 23, respectively. Each single winding is series-connected with a valve element 24, 25, 26, 27, respectively. One winding from each transductor element is connected in series with a Graetz-connected rectifier to an alternating current source at 21. Thus the windings 20 and 22 are connected in series with the rectifier 29, and the windings 21 and 23 in series with the rectifier 30. On each transductor element the two windings are so arranged that they oppose each other. The direct current terminals of the two rectifiers 29 and 30 are series-connected and connected to an instrument 13.

In a certain moment the current through the windings 20, 22 is supposed to be larger than the current through the windings 21, 23. From the rectifier 29 the current is then fed through the winding 20 to the circuit through the instrument 13, and all valve elements in the rectifier 30 will be active and the current from the winding 21 may thus be admitted to the winding 23. If the opposite rate of magnitude exists between the currents through the windings, in the same way the larger current from the winding 21 will be admitted to the instrument circuit, and the demands according to the invention will be fulfilled.

In Figure 6 the use of transductor elements without internal self-magnetization is exemplified. Each one of the parallel connected alternating current windings 32 and 33 is on one hand series-connected with a rectifier 34 and 35, respectively, feeding self-magnetizing windings 36 and 37, respectively, and on the other hand with a rectifier 38 and 39, respectively, the direct current sides of the latter being series-connected with each other and with an instrument 13. Points 40 and 41 between the alternating current windings and the rectifiers 38, 39, respectively, are connected to an alternating current source 42.

From this connection it is obvious that the instrument will be traversed by the momentarily largest of the currents through the transductor elements, as the rectifiers 38 and 39 are connected analogously to corresponding rectifiers 29, 30 in Figure 5.

Figure 7 exemplifies the use of a three-phase transductor where the transductor elements 43, 44, 45 are fed from the alternating current line at 46 via transformer, which may be primarily star-connected as shown in the figure, and which may be a three-phase transformer or may consist of three one-phase transformers 47, 48, 49.

In series with each transductor winding a valve element 50, 51, 52 is connected and in parallel with each such combination a valve element 53, 54, 55 is arranged. These latter valve elements are connected in series and are connected to an instrument 13. As the valve elements 53, 54, 55 are connected in series, the current in the circuit through the instrument 13 is determined by the momentarily largest current in the transductor elements 43, 44, 45.

The instrument current as a function of the current to be measured will in the forms illustrated in the Figures 5-7 substantially have the same course as the curve A'A'' in Figure 3.

When measuring a large current, however, the negative self-magnetization must be further increased in order that the power consumption from the alternating current source shall be small. The possibilities of attaining this requirement will be further described in connection with the form according to Figure 1, but the corresponding steps may of course also improve the devices illustrated in Figures 5-7.

Figure 8 thus shows a device which mainly differs from the form shown in Figure 1 only in that on each transductor element a further winding 56, 57, respectively, is arranged, said windings being traversed by a current between the direct current terminals 16 and 17 in such a direction that their ampere turns oppose the field from the current to be measured. By this arrangement, the curve B'B'' of Figure 3 is obtained. According to the invention the branch B'' of that curve is used.

It is understood from Figure 3 that the instrument current $I_A$ for small currents in the direct current bus-bar, below the value $I_{S1}$ will rise discontinuously to the branch B'. If the current in the bus-bar is increased again, the curve B' will be followed until the current $I_S$ has exceeded the value $I_{S2}$, and then the instrument current will suddenly fall to the value determined by the branch B''.

This disadvantage may be avoided by providing the transductor with a pre-magnetization, for instance by means of a current $I_{S0}$, somewhat larger than $I_{S1}$, operating in the same direction as the current to be measured. In this way, however, the instrument current will not be the lowest possible according to the transductor curve, when the current to be measured is 0. This problem may be solved by subtracting from the instrument current a current of such a magnitude that the instrument current will obtain its minimum value when the current to be measured is 0. The pre-magnetization corresponding to the current $I_{S0}$ as well as the circuit used for the said subtraction, however, are subjected to variations, on one hand originating from the current source from which they are obtained, and on the other hand from variations in the winding resistances owing to temperature differences. If the two currents, however, are brought to vary in the same manner, it is possible to connect them in such a way, that variations in the instrument current are neutralized. This requirement may be reached if the same current can be used for both purposes, but as the resistance variations of copper usually are of minor significance in the circuit, it may be sufficient to derive the currents from the same source.

In Figure 9 one way is shown to accomplish said pre-magnetization and subtraction. The device is based upon that shown in Figure 8 and has, moreover, two series-connected premagnetization windings 58, 59, each arranged on a transductor element. These windings are fed with direct current for instance obtained from a rectifier 60, connected to an alternating current line at 61. In addition, the current through the windings 58, 59 may traverse the instrument 13 in such a way that it opposes the direct current from the transductor.

Figure 10 shows two modifications of a device independent of each other, according to Figure 9. On one hand the above mentioned subtraction is shown to be accomplished in an auxiliary transductor 63, and on the other hand the series-connected pre-magnetization windings of the measuring transductor are parallel-connected with the circuit traversed by the current, which is arranged to eliminate said pre-magnetization. The current derived from the direct current terminals 16, 17 of the transductor magnetizes an excitation winding 62, of the auxiliary transductor 63, which is connected to an alternating current source at 64. The transductor windings 58, 59 are fed from the rectifier 60 in series with a resistor 68, from said rectifier. Current is also supplied to another excitation winding 65 of the auxiliary transductor in series with a resistor 69. The purpose of winding 65 is to magnetize the transductor 63 in opposite direction of winding 62. The resistance of the resistors 68 and 69 shall be so large that it predominates the winding resistance in corresponding circuits.

The alternating current through the auxiliary transductor 63, which is proportional to the difference between the direct currents in its magnetization windings, may be transformed to a suitable value by means of a current transformer 66 and then rectified in a rectifier 67, so that a direct current instrument 13 may be used. The use of such an auxiliary transductor on the one hand has the advantage that the instrument current may be given an arbitrary value, and on the other hand that the different winding ampere turns may be adapted to suitable arbitrary values of the different currents in the device.

It is of course also possible to use the method indicated in Figure 9 at Figure 10 for subtraction of the pre-magnetization current, and in such case the windings 58, 59 may be connected in series with the winding 65 of the auxiliary transductor 63.

I claim as my invention:

1. A device for measuring direct current in a conductor, comprising at least two transductor cores adjacent said conductor, power windings one on each of said cores, a first current circuit including at least two unidirectional valve elements connected in series in the same direction, indicating means responsive to flow of current in said first circuit, alternating current supply means, a second circuit connected to said alternating current supply means and including in series in order a first terminal of said alternating current supply means, the power winding on one of said cores, and a first of said valve elements of the first circuit, and further including another unidirectional valve element opposing said valve element of the first circuit between said first terminal of the alternating current supply means and said first valve element of the first circuit, and a third circuit connected to said alternating current supply means and including in series in order the said first terminal of the alternating current supply means, the power winding of a different one of said transductor cores and a second of the valve elements of the first circuit, and further including a unidirectional valve element opposing the said second valve element of the first circuit between said first terminal of the alternating current supply means and said second valve element of the first circuit, said direct current conductor being so related to said power windings as to produce ampere turns in each of the cores opposing those produced therein by said alternating current supply means.

2. A device as claimed in claim 1 in which said indicating means comprises a measuring instrument in said first circuit.

3. In a device as claimed in claim 1, which comprises at least three transductor cores, power windings on each of said cores, and in which said first circuit includes at least three unidirectional valve elements in series in the same direction, a fourth circuit connected to said alternating current supply means and including in series in order said first terminal of said alternating current supply means, the power winding on still a different one of said transductor cores and a third of the valve elements of the first circuit, and further including a unidirectional valve element opposing the said third valve element of the first circuit between said first terminal of the alternating current supply means and said third valve element of the first circuit, said alternating current supply means furnishing three-phase current.

4. In a device as claimed in claim 1, auxiliary windings one on each of said cores, said auxiliary windings being connected in said first circuit in series with the valve elements thereof.

5. In a device as claimed in claim 1, auxiliary windings one on each of said cores, premagnetization windings one on each of said cores, said indicating means including a measuring instrument in said first circuit, said auxiliary windings being connected in said first circuit in series with the valve elements thereof, a source of direct current, and a fourth circuit connected to said source of direct current and including in series said premagnetizing windings and said measuring instrument, said premagnetizing windings being arranged to produce ampere turns in each of said cores cooperating with those produced by said direct current conductor.

6. In a device as claimed in claim 1, auxiliary windings one on each of said cores, premagnetizing windings one on each of said cores, said auxiliary windings being connected in said first circuit in series with the valve elements thereof, a source of direct current, a fourth circuit connecting said premagnetizing windings in series to said source of direct current, said indicating means including a measuring instrument, an auxiliary transductor having a main winding and two exciting windings, one of said exciting windings being connected in said first circuit, means to supply alternating current to said main winding of said auxiliary transductor, means connecting the other exciting winding of said auxiliary transductor to said source of direct current, said exciting windings of the auxiliary conductor being so arranged that the ampere turns produced thereby oppose each other, and a transformer having its primary connected to the main winding of the auxilary transductor and its secondary winding connected to said measuring instrument, said premagnetizing windings being arranged to produce ampere turns in each of said cores cooperating with those produced by said direct current conductors.

7. A device for measuring direct current in a conductor, comprising at least two transductor cores adjacent said conductor, power windings one on each of said cores, a current circuit including at least two unidirectional valve elements connected in series in the same direction, a first portion of the circuit lying between said two valve elements, and a measuring instrument in a second portion of said circuit, alternating current supply means, a connection from a first terminal of said alternating current supply means to a junction point, a connection from the second terminal of the alternating current supply means to a point of the first portion of said circuit between the two valve elements thereof, a first connection from said second portion of said circuit at a point on one side of said measuring instrument to said junction point, said first connection including a first of said power windings and a unidirectional valve element opposing the valve element of the first circuit on the same side of the measuring instrument as said first connection, and a second connection from said second portion of said circuit at a point on the other side of said instrument to said junction point, said second connection including a power winding on a different one of said transductor cores and another unidirectional valve element opposing the valve element of the first circuit on the same side of the valve element as said second connection, said direct current conductor being so related to said power windings as to produce ampere turns in each of the cores opposing those produced therein by said alternating current supply means.

References Cited in the file of this patent

UNITED STATES PATENTS

| | | |
|---|---|---|
| 2,388,070 | Middel | Oct. 30, 1945 |
| 2,403,891 | Lamm | July 9, 1946 |
| 2,412,046 | Hoare | Dec. 3, 1946 |
| 2,485,657 | Rex | Oct. 25, 1949 |
| 2,525,451 | Graves | Oct. 10, 1950 |
| 2,552,203 | Morgan | May 8, 1951 |
| 2,567,725 | Morgan | Sept. 11, 1951 |
| 2,573,255 | Forssell | Oct. 30, 1951 |
| 2,605,302 | Specht | July 29, 1952 |
| 2,611,889 | Huge | Sept. 23, 1952 |
| 2,614,139 | Baxter | Oct. 14, 1952 |

FOREIGN PATENTS

| | | |
|---|---|---|
| 522,671 | Great Britain | June 24, 1940 |
| 894,702 | France | Jan. 4, 1945 |